United States Patent
Oda

(10) Patent No.: US 11,067,753 B2
(45) Date of Patent: Jul. 20, 2021

(54) OPTICAL MODULE AND METHOD FOR PRODUCING SAME

(71) Applicant: FUJIKURA LTD., Tokyo (JP)

(72) Inventor: Takuya Oda, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/624,248

(22) PCT Filed: Apr. 2, 2018

(86) PCT No.: PCT/JP2018/014099
§ 371 (c)(1),
(2) Date: Dec. 18, 2019

(87) PCT Pub. No.: WO2018/235381
PCT Pub. Date: Dec. 27, 2018

(65) Prior Publication Data
US 2020/0132935 A1 Apr. 30, 2020

(30) Foreign Application Priority Data
Jun. 19, 2017 (JP) .............................. JP2017-119326

(51) Int. Cl.
*G02B 6/30* (2006.01)
*G02B 6/14* (2006.01)

(52) U.S. Cl.
CPC ........ *G02B 6/30* (2013.01); *G02B 6/14* (2013.01)

(58) Field of Classification Search
CPC ...... G02B 6/30; G02B 6/14; G02B 6/32; G02B 6/26; G02B 6/262; G02B 6/305
USPC ................... 385/14, 49–51, 88–92, 129–132
See application file for complete search history.

(56) References Cited

U.S. PATENT DOCUMENTS

| | | | |
|---|---|---|---|
| 5,261,017 A | 11/1993 | Melman et al. | |
| 2004/0184705 A1 | 9/2004 | Shimada et al. | |
| 2005/0254770 A1* | 11/2005 | Watanabe | G02B 6/3636 385/137 |

FOREIGN PATENT DOCUMENTS

| | | |
|---|---|---|
| JP | H02195309 A | 8/1990 |
| JP | H06300939 A | 10/1994 |
| JP | H0996745 A | 4/1997 |
| JP | H11218626 A | 8/1999 |

(Continued)

OTHER PUBLICATIONS

International Preliminary Report on Patentability issued in corresponding International Application No. PCT/JP2018/014099, dated Jan. 2, 2020, with translation (11 pages).

(Continued)

*Primary Examiner* — Michael P Mooney
(74) *Attorney, Agent, or Firm* — Osha Bergman Watanabe & Burton LLP

(57) ABSTRACT

An optical module includes: a substrate-type optical waveguide device; and an optical fiber that guides light that enters or exits the waveguide device. Spot sizes w1 and w2 satisfy 1<w2/w1<α; w1 is a spot size: on an end surface of the substrate-type optical waveguide device, and of a waveguide mode guided through a core of the substrate-type optical waveguide device, w2 is a spot size: on an end surface of the optical fiber, and of a waveguide mode guided through a core of the optical fiber, and a is a spot size ratio w2/w1 at which an efficiency η(0) is equal to the efficiency η(0) when w2/w1=1.

19 Claims, 8 Drawing Sheets

(56) References Cited

FOREIGN PATENT DOCUMENTS

| | | | |
|---|---|---|---|
| JP | 2001242337 | A | 9/2001 |
| JP | 2003302545 | A | 10/2003 |
| JP | 2004151391 | A | 5/2004 |
| JP | 2004233982 | A | 8/2004 |
| WO | 2012/114866 | A1 | 8/2012 |
| WO | 2014176175 | A1 | 10/2014 |

OTHER PUBLICATIONS

International Search Report issued in corresponding International Application No. PCT/JP2018/014099, dated Jun. 26, 2018 (2 pages).

* cited by examiner

RELATED ART

OPTICAL MODULE AND METHOD FOR PRODUCING SAME

TECHNICAL FIELD

The present invention relates to (i) an optical module including a substrate-type optical waveguide device and an optical fiber and (ii) a method for producing such an optical module.

BACKGROUND

Recent years have seen active development of a substrate-type optical waveguide device such as a silicon photonics device and an indium phosphide waveguide device. The substrate-type optical waveguide device has a large refractive index difference between the core and the cladding, and has a strong optical confinement effect. The substrate-type optical waveguide device can thus have a waveguide mode having a small mode field diameter of not more than 1 µm.

Light is inputted into and outputted from a substrate-type optical waveguide device typically with use of an optical fiber. An optical fiber, however, has a waveguide mode with a mode field diameter that is typically larger than the mode field diameter of a waveguide mode for a substrate-type optical waveguide device. For example, a typical silicon photonics device has a waveguide mode with a mode field diameter of approximately 0.2 µm, whereas a typical single-mode fiber has a waveguide mode with a mode field diameter of approximately 10 µm. Thus, in a case where an optical module is used that includes a substrate-type optical waveguide device and an optical fiber, it is important to avoid discrepancy between the respective mode field diameters of the substrate-type optical waveguide device and the optical fiber to increase the efficiency of coupling between the substrate-type optical waveguide device and the optical fiber.

Example methods for avoiding discrepancy between the respective mode field diameters of a substrate-type optical waveguide device and an optical fiber include (i) a method of increasing the mode field diameter of the waveguide mode of the substrate-type optical waveguide device in the vicinity of each of the entrance end facet and the emission end facet and (ii) a method of reducing the mode field diameter of the waveguide mode of the optical fiber in the vicinity of each of the emission end facet and the entrance end facet. A known example of the former method is a technique of providing a spot-size converter in the vicinity of each of the entrance end facet and the emission end facet of a substrate-type optical waveguide device to increase the mode field diameter of the waveguide mode to approximately 3 µm to 4 µm. A known example of the latter method is a technique of processing each of the emission end facet and the entrance end facet of an optical fiber into a lens to reduce the mode field diameter of the waveguide mode. Combining these techniques makes it possible to increase the efficiency of coupling between a substrate-type optical waveguide device and an optical fiber.

There is another matter to think about in designing an optical module having a high efficiency of coupling between a substrate-type optical waveguide device and an optical fiber: how to accurately align the central axis of the core of the substrate-type optical waveguide device with the central axis of the core of the optical fiber. This is because even a slight axis misalignment between the respective cores of a substrate-type optical waveguide device and an optical fiber significantly decreases the efficiency of coupling between the substrate-type optical waveguide device and the optical fiber. An optical fiber is fixed to a substrate-type optical waveguide device with use of resin, which may be expanded or shrunk to cause axis misalignment. Such axis misalignment can lead to a decrease in the coupling efficiency during use, and thus needs to be avoided.

Assuming that light exiting an optical fiber and entering a substrate-type optical waveguide device is a Gaussian beam having a wavelength $\lambda$, the efficiency $\eta$ of coupling between the optical fiber and the substrate-type optical waveguide device is given by the formula below. In the formula below, w1 represents the spot size of a waveguide mode in the vicinity of the emission end facet of the substrate-type optical waveguide device; w2 represents the spot size of a waveguide mode in the vicinity of the entrance end facet of the optical fiber; z represents the distance between the entrance end facet of the substrate-type optical waveguide device and the emission end facet of the optical fiber; and x represents the distance (hereinafter referred to as "axis misalignment amount") between the central axis of the core of the substrate-type optical waveguide device and the central axis of the core of the optical fiber. The formula assumes an x axis in a direction that is orthogonal to the central axis of the core of the substrate-type optical waveguide device and that is parallel to a direction in which the optical fiber may be displaced. The axis misalignment amount x is positive in a case where the central axis of the core of the optical fiber is shifted from the central axis of the core of the substrate-type optical waveguide device on the x-axis positive direction side. The axis misalignment amount x is negative in a case where the central axis of the core of the optical fiber is shifted from the central axis of the core of the substrate-type optical waveguide device on the x-axis negative direction side.

$$\eta = \kappa \exp\left\{-\kappa \frac{x^2}{2}\left(\frac{1}{w_1^2} + \frac{1}{w_2^2}\right)\right\}$$

$$\kappa = \frac{4}{\left(\frac{w_1}{w_2} + \frac{w_2}{w_1}\right)^2 + \left(\frac{\lambda z}{\pi w_1 w_2}\right)^2}$$

FIG. 8 is a graph that shows the relation between the axis misalignment amount x and the coupling efficiency $\eta$ both given by the formula above in a case where $\lambda=1.55$ µm, w1=w2=1.5 µm, and z=5 µm. The graph of FIG. 8 shows that an axis misalignment of approximately 1 µm between the respective cores of a substrate-type optical waveguide device and an optical fiber causes a decrease of approximately 2 dB in the efficiency $\eta$ of coupling between the substrate-type optical waveguide device and the optical fiber.

Conventional optical modules are typically arranged in either of the following two manners: (i) The spot size w1 for a substrate-type optical waveguide device is increased over the spot size w2 for an optical fiber (see Patent Literature 1). (ii) The spot size w1 for a substrate-type optical waveguide device is adjusted with respect to the spot size w2 for an optical fiber (see Patent Literature 2) so that the spot size w1 for the substrate-type optical waveguide device is equal to the spot size w2 for the optical fiber.

PATENT LITERATURE

[Patent Literature 1]
Japanese Patent Application Publication, Tokukaihei, No. 11-218626
[Patent Literature 2]
Japanese Patent Application Publication, Tokukai, No. 2001-242337

Conventional optical modules unfortunately leave room for improvement in the efficiency of coupling between a substrate-type light waveguide and an optical fiber. Further, there has been a demand for a greater tolerance for axis misalignment (hereinafter referred to as "axis misalignment tolerance") in terms of coupling efficiency so that axis misalignment between the respective cores of a substrate-type optical waveguide device and an optical fiber will not cause a large decrease in the coupling efficiency.

SUMMARY

One or more embodiments of the present invention provide an optical module having a higher-than-conventional efficiency of coupling between a substrate-type optical waveguide device and an optical fiber.

An optical module in accordance with one or more embodiments of the present invention includes: a substrate-type optical waveguide device; and an optical fiber which guides light that enters the substrate-type optical waveguide device or light that exited the substrate-type optical waveguide device, spot sizes w1 and w2 being set so that the following inequality is satisfied: $1<w2/w1<\alpha$, where w1 represents a spot size on an end surface of the substrate-type optical waveguide device, which spot size w1 is of a waveguide mode guided through a core of the substrate-type optical waveguide device, w2 represents a spot size on an end surface of the optical fiber, which spot size w2 is of a waveguide mode guided through a core of the optical fiber, and a represents a spot size ratio w2/w1 at which an efficiency $\eta(0)$ of coupling between the substrate-type optical waveguide device and the optical fiber which efficiency $\eta(0)$ is obtained when an amount of axis misalignment between the core of the substrate-type optical waveguide device and the core of the optical fiber is 0 is equal to an efficiency $\eta(0)$ of coupling between the substrate-type optical waveguide device and the optical fiber which efficiency $\eta(0)$ is obtained when w2/w1=1.

A production method in accordance with one or more embodiments of the present invention is a method for producing an optical module including (i) a substrate-type optical waveguide device and (ii) an optical fiber which guides light that enters the substrate-type optical waveguide device or light that exited the substrate-type optical waveguide device, the method including the step of: setting spot sizes w1 and w2 so that the following inequality is satisfied: $1<w2/w1<\alpha$, where w1 represents a spot size of a waveguide mode guided through a core of the substrate-type optical waveguide device, w2 represents a spot size of a waveguide mode guided through a core of the optical fiber, and a represents a spot size ratio w2/w1 at which an efficiency $\eta(0)$ of coupling between the substrate-type optical waveguide device and the optical fiber which efficiency $\eta(0)$ is obtained when an amount of axis misalignment between the core of the substrate-type optical waveguide device and the core of the optical fiber is 0 is equal to an efficiency $\eta(0)$ of coupling between the substrate-type optical waveguide device and the optical fiber which efficiency $\eta(0)$ is obtained when w2/w1=1.

One or more embodiments of the present invention provide a substrate-type optical waveguide device of which the coupling efficiency $\eta(0)$ for a case where the axis misalignment amount is 0 is larger than conventional.

Figure 3:
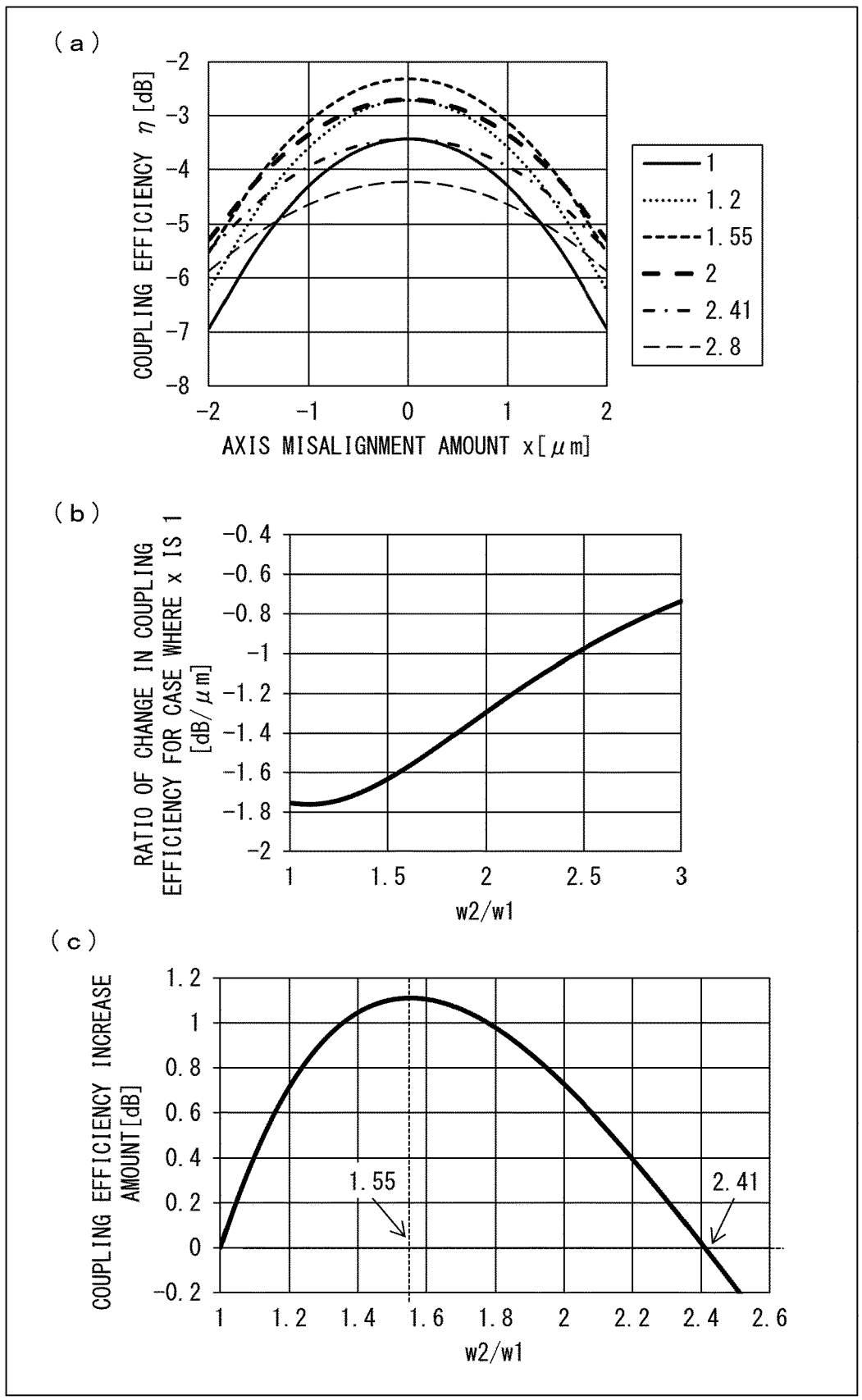

(a) of FIG. 3 is a graph that shows a coupling efficiency $\eta$[dB] as a function of an axis misalignment amount x [μm] for cases where the spot size ratio w2/w1 is 1, 1.2, 1.55, 2, 2.41, and 2.8. (b) is a graph that shows, as a function of the spot size ratio w2/w1, the ratio $d\eta/dx(1)$ [dB/μm] of change in the coupling efficiency $\eta$[dB] for a case where the axis misalignment amount x is 1. (c) is a graph that shows, as a function of the spot size ratio w2/w1, the coupling efficiency $\eta(0)$ [dB] for a case where the axis misalignment amount x is 0.

Figure 4:
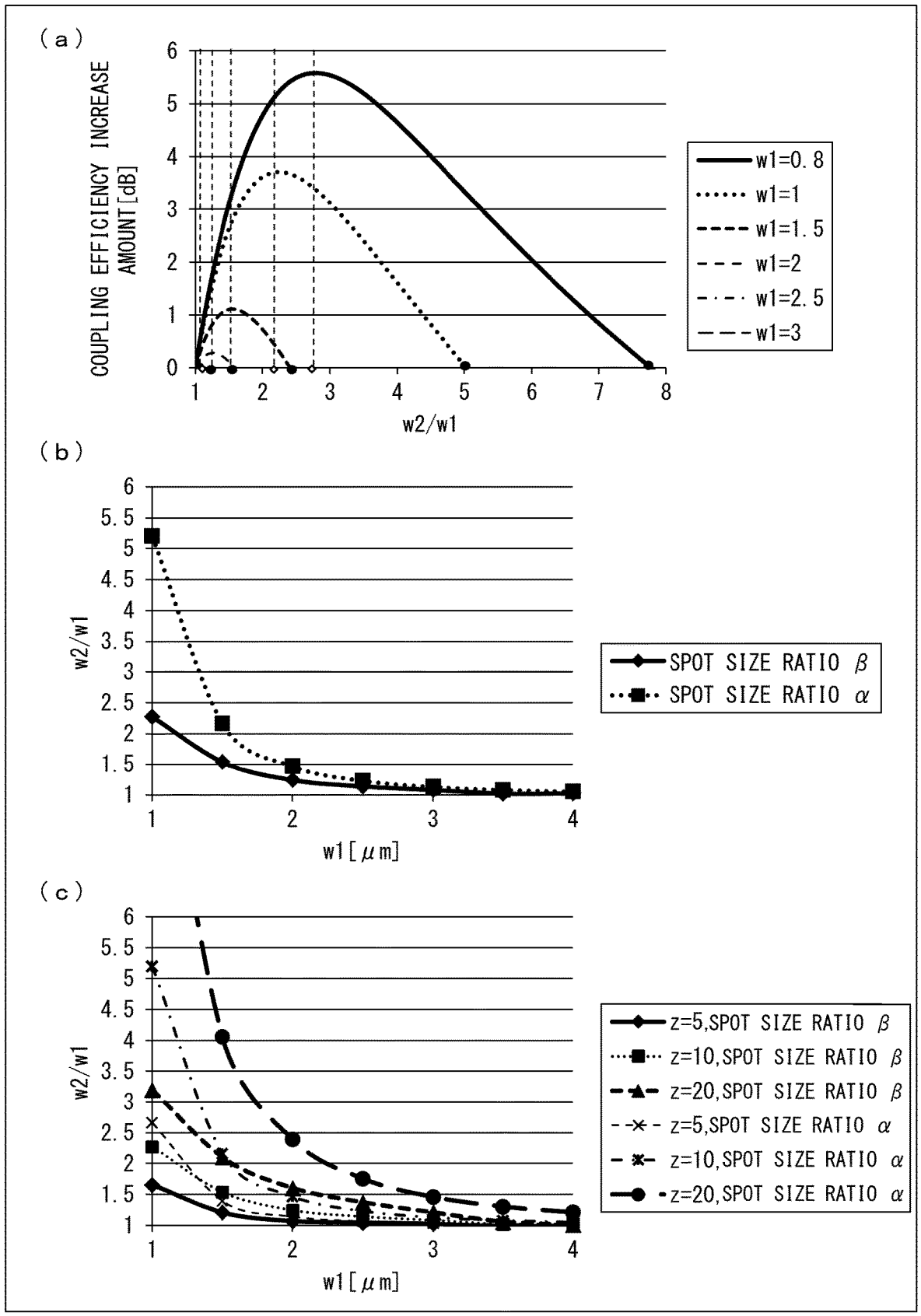

(a) of FIG. 4 is a graph that shows, as a function of the spot size ratio w2/w1, a coupling efficiency $\eta(0)$ [dB] for a case where the axis misalignment amount x is 0 with the inter-end-surface distance z being 10 and the spot size w1 being 0.8, 1.0, 1.5, 2.0, 2.5, and 3.0. (b) is a graph that shows, each as a function of the spot size w1, (i) the spot size ratio α (at which the coupling efficiency $\eta(0)$ obtained when the axis misalignment amount x is 0 is equal to the coupling efficiency $\eta(0)$ which efficiency $\eta(0)$ is obtained when w2/w1=1) and the spot size ratio β (at which the coupling efficiency $\eta(0)$ obtained when the axis misalignment amount x is 0 is at its maximum) for a case where the inter-end-surface distance z is 10. (c) is a graph that shows, each as a function of the spot size w1, (i) the spot size ratio α (at which the coupling efficiency $\eta(0)$ obtained when the axis misalignment amount x is 0 is equal to the coupling efficiency $\eta(0)$ for the case where w2/w1=1) and the spot size ratio β (at which the coupling efficiency $\eta(0)$ obtained when the axis misalignment amount x is 0 is at its maximum) for cases where the inter-end-surface distance z is 5, 10, and 20.

Figure 5:
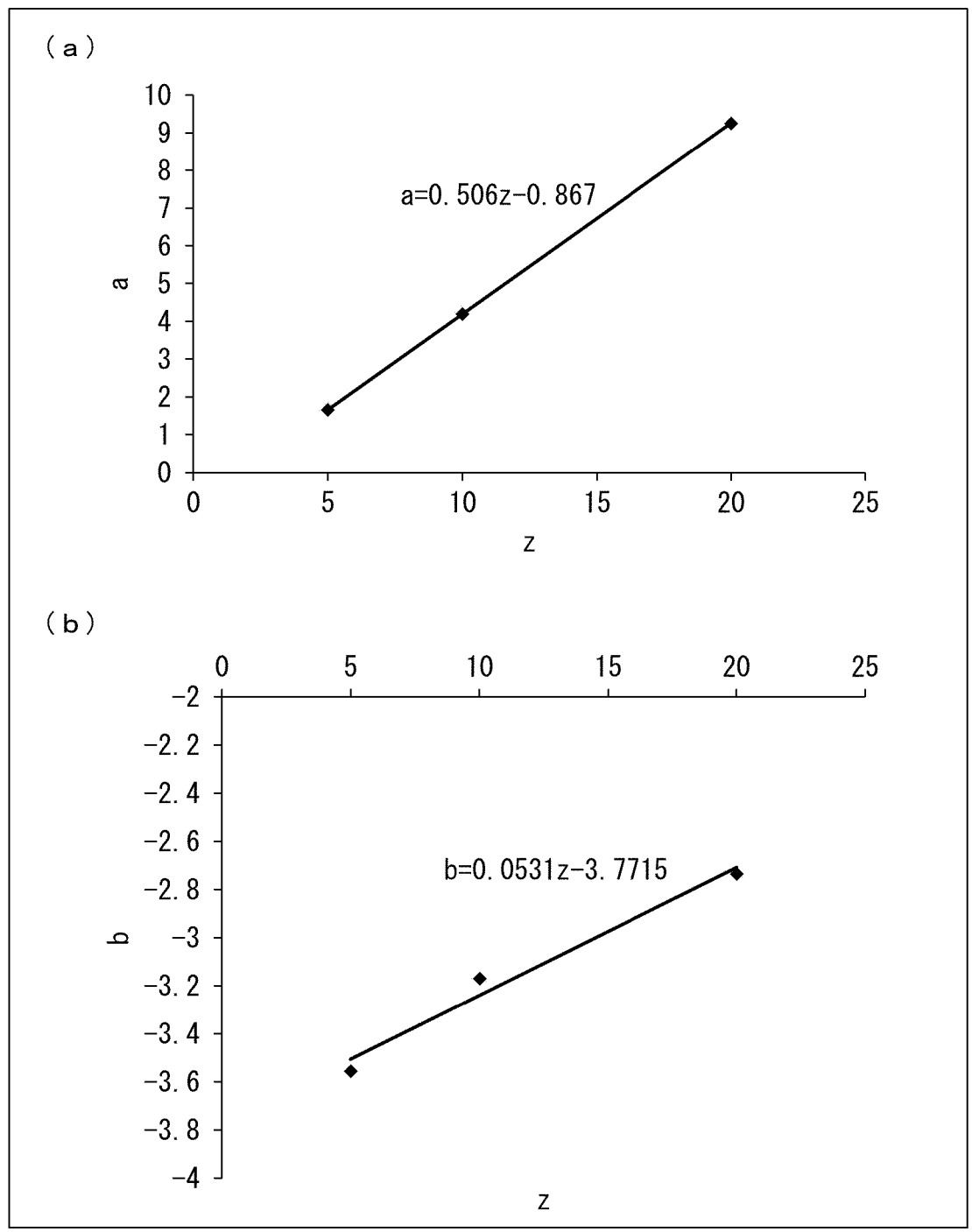

FIG. 5 provides graphs that show the relation between respective coefficients a and b and the inter-end-surface distance z, the coefficients a and b each being of a curve $\alpha=a\times w1^b+1$ that best approximates the lines for the spot size ratio α in (c) of FIG. 4.

Figure 6:
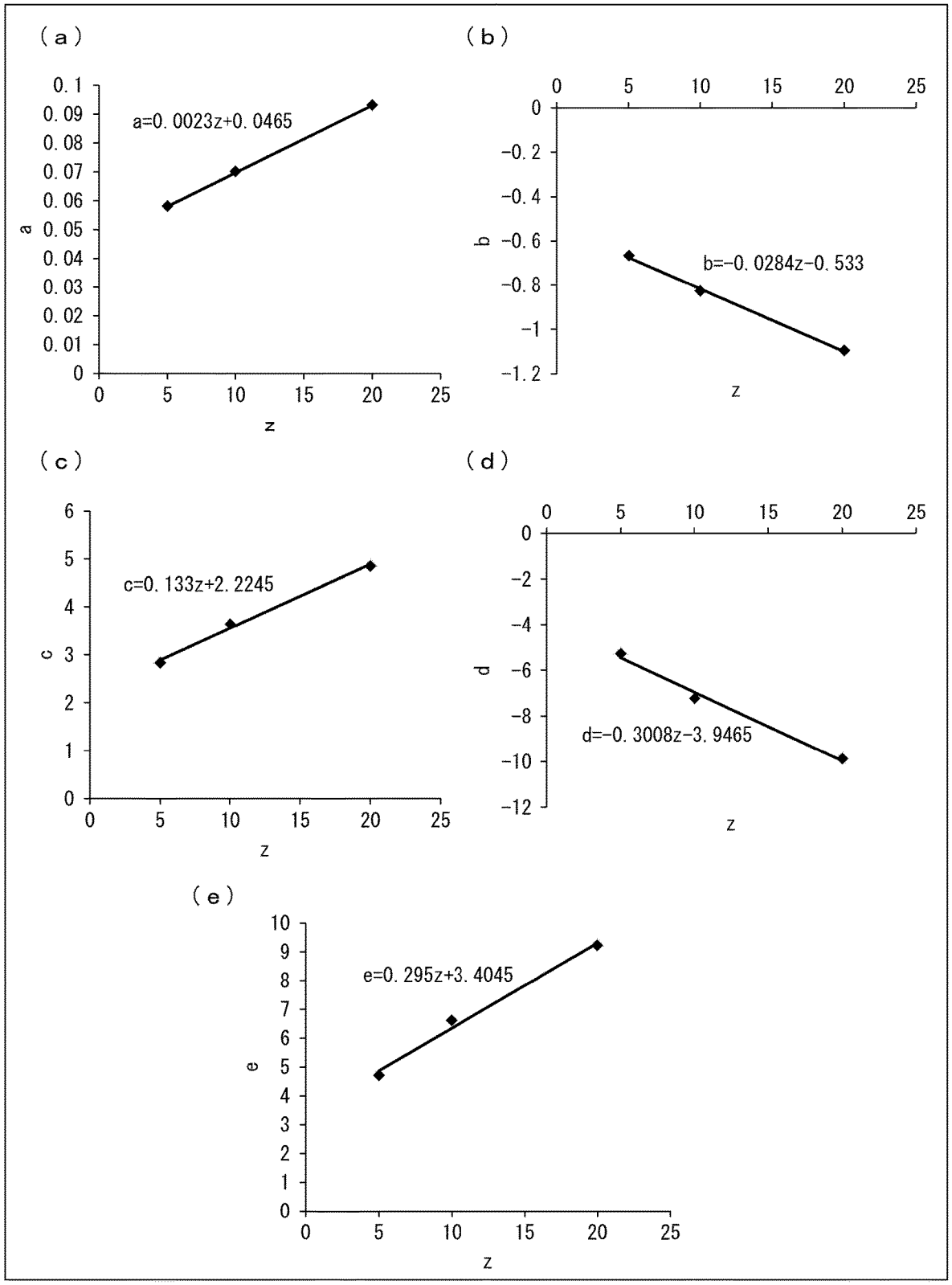

FIG. 6 provides graphs that show the relation between respective coefficients a, b, c, d, and e and the inter-end-surface distance z, the coefficients a, b, c, d, and e each being of a curve $\beta=aw1^4+bw1^3+cw1^2+dw+e$ that best approximates the lines for the spot size ratio β in (c) of FIG. 4.

Figure 7:
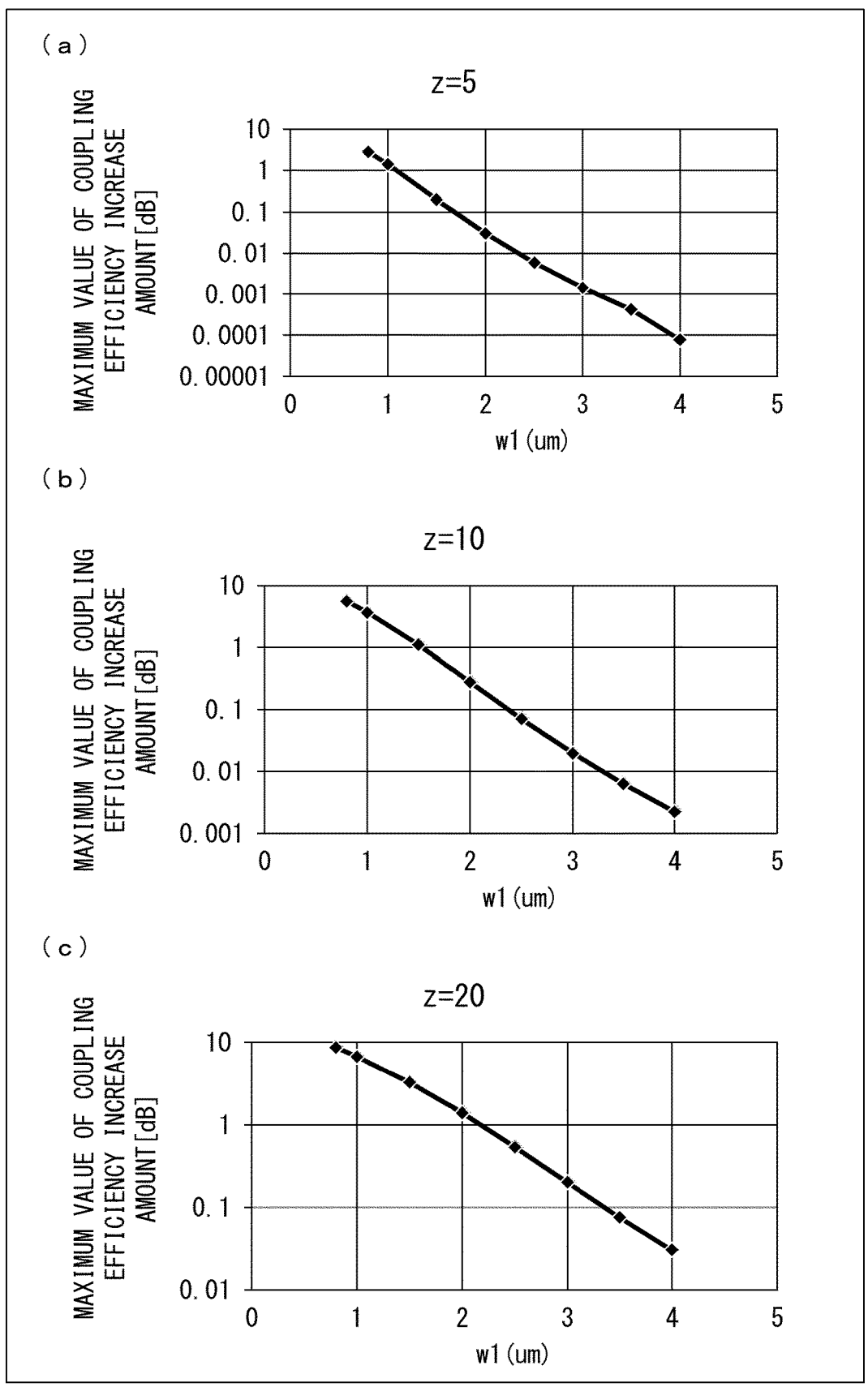

FIG. 7 provides graphs each of which shows a coupling efficiency increase amount as a function of the spot size w1. (a) assumes z=5 μm. (b) assumes z=10 μm. (c) assumes z=20.

Figure 8:
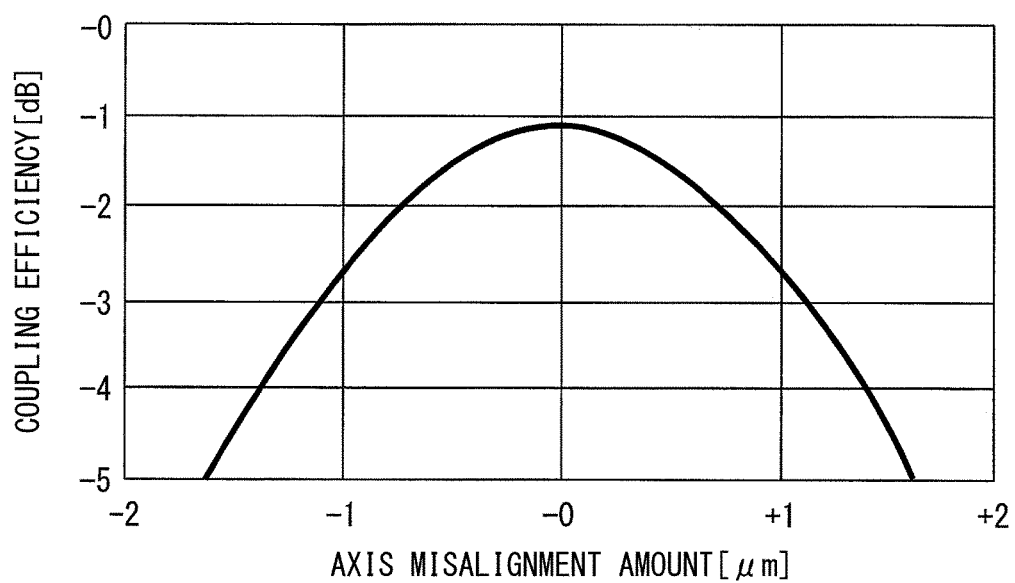

FIG. 8 is a graph that shows the relation between an axis misalignment amount x and a coupling efficiency $\eta$ for a conventional optical module.

DETAILED DESCRIPTION

[Configuration of Optical Module]

Figure 1:
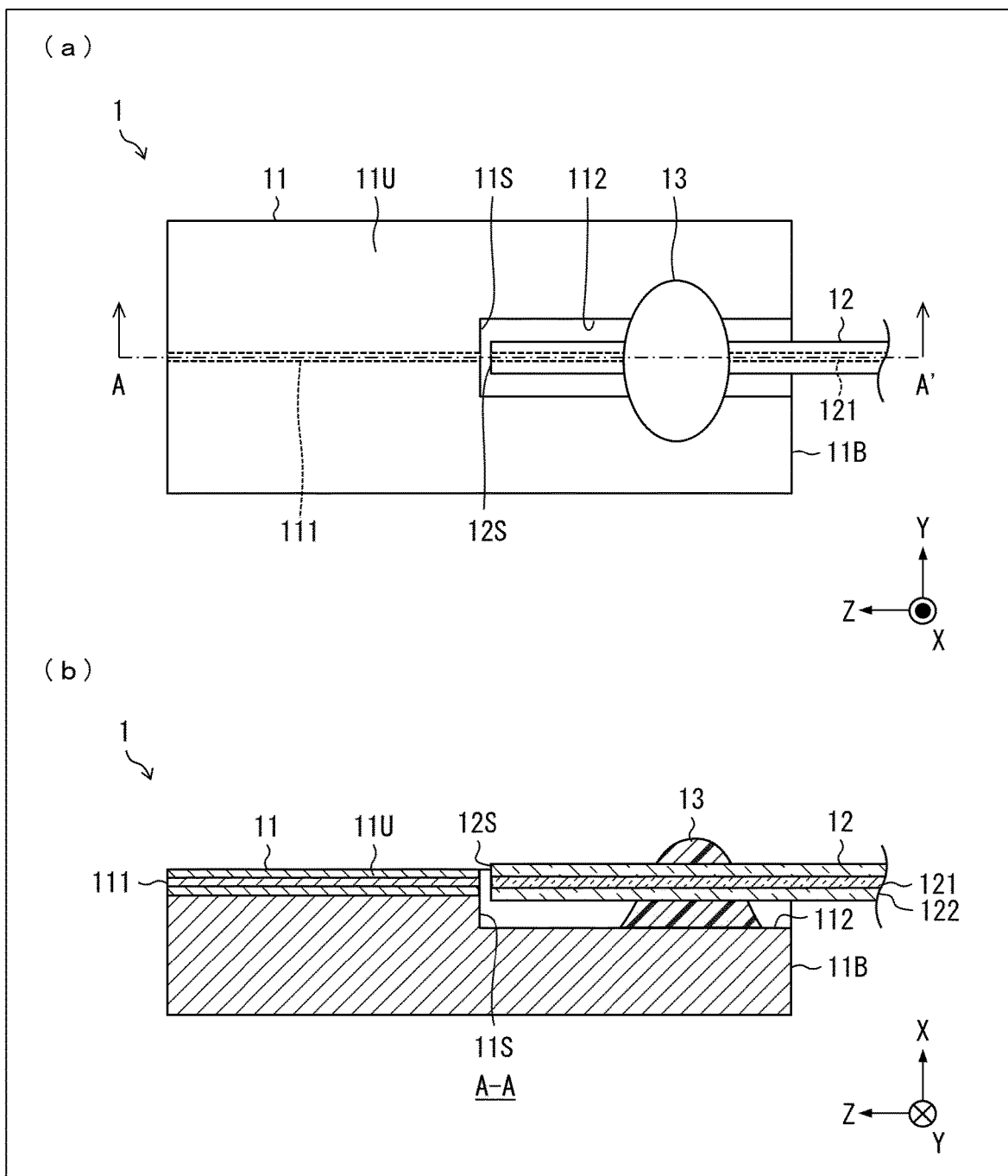
FIG. 1 provides views of an optical module in accordance with one or more embodiments of the present invention. (a) is a plan view of the optical module. (b) is a cross-sectional view of the optical module.

The description below deals with the configuration of an optical module 1 in accordance with one or more embodiments of the present invention with reference to FIG. 1. (a) of FIG. 1 is a plan view of the optical module 1. (b) of FIG. 1 is a cross-sectional view of the optical module 1 taken along line A-A'. For each coordinate system illustrated, the description below uses terms such as "above" to refer to the X-axis positive direction, terms such as "below" to refer to the X-axis negative direction, terms such as "right" to refer to the Y-axis positive direction, terms such as "left" to refer to the Y-axis negative direction, terms such as "front" to refer to the Z-axis positive direction, and terms such as "back" to refer to the Z-axis negative direction. The above terms such as "above", "below", "right", "left", "front", and "back" are used herein merely for convenience of concise description of how the optical module 1 is structured, and do not intend to restrict the orientation of the optical module 1 in any manner.

The optical module 1, as illustrated in FIG. 1, includes a substrate-type optical waveguide device 11 and an optical fiber 12. The optical fiber 12 serves to guide (i) input light to be inputted into the substrate-type optical waveguide device 11 or (ii) output light outputted from the substrate-type optical waveguide device 11.

The substrate-type optical waveguide device 11 includes a substrate having a core 111 and a recess 112. According to one or more embodiments, as the substrate-type optical waveguide device 11, a silicon photonics device including a silicon-on-insulator (SOI) substrate having a core 111 and a recess 112 is used. The substrate-type optical waveguide device 11 is oriented in such a manner as to, in the coordinate system illustrated, have (i) two principal surfaces (that is, an upper surface and a lower surface) facing the X-axis positive direction and the X-axis negative direction, respectively, and (ii) four side surfaces facing the Y-axis positive direction, the Y-axis negative direction, the Z-axis positive direction, and the Z-axis negative direction, respectively.

The recess 112 is a space at a back end of the upper surface 11U of the substrate-type optical waveguide device 11 in which space to place a tip of the optical fiber 12. The recess 112 is in the shape of a rectangular parallelepiped that is open in the upward and backward directions and that is defined by end surfaces of the substrate-type optical waveguide device 11 in the downward, forward, rightward, and leftward directions. The recess 112 is present at a portion of the substrate-type optical waveguide device 11 at which portion the upper surface 11U and the back side surface 11B intersect with each other.

The core 111 is a region present inside the substrate-type optical waveguide device 11 for guiding light. The core is made of a material (such as silicon) having a refractive index higher than that of the other portion (such as a silica film that functions as a cladding) of the substrate-type optical waveguide device 11. The core 111 is exposed on the end surface 11S of the substrate-type optical waveguide device 11, which end surface 11S is present at the front of the recess 112. In the vicinity of the end surface 11S, the core 111 has a central axis orthogonal to the end surface 11S.

The substrate-type optical waveguide device 11 may be provided with a spot-size converter for increasing the spot size of a waveguide mode guided through the core 111. Such a spot-size converter is capable of increasing the spot size (which is of a waveguide mode guided through the core 111) on the end surface 11S up to, for example, approximately 3 µm or 1.5 µm. The core 111 may have any path inside the substrate-type optical waveguide device 11 at a portion other than the portion illustrated in FIG. 1. The substrate-type optical waveguide device 11 may include a functional section (not shown) that acts on light propagating through the core 111. The substrate-type optical waveguide device 11 may include, for example, a modulating section for modulating light propagating through the core 111.

The optical fiber 12 includes a core 121 in the shape of a circular column and a cladding 122 in the shape of a hollow cylinder that covers the side surface of the core 121. According to one or more embodiments, as the optical fiber 12, a single-mode fiber including a core 121 and a cladding 122 both made of silica glass is used. The core 121 or the cladding 122 contains a dopant for the cladding 122 to have a refractive index lower than that of the core 121. Input light guided through the optical fiber 12 is confined in the core 121 due to the refractive index difference. The core 121 is exposed on an end surface 12S of the optical fiber 12.

The optical fiber 12 has a tip placed in the recess 112 of the substrate-type optical waveguide device 11 in such a manner that that portion of the core 121 which is on the end surface 12S of the optical fiber 12 faces that portion of the core 111 which is on the end surface 11S of the substrate-type optical waveguide device 11. The tip of the optical fiber 12 is fixed to the substrate-type optical waveguide device 11 by a resin material 13 injected into the recess 112 of the substrate-type optical waveguide device 11. With the tip fixed as such, the core 121 has a central axis in the vicinity of the end surface 12S of the optical fiber 12 which central axis is parallel to the central axis of the core 111 in the vicinity of the end surface 11S of the substrate-type optical waveguide device 11. The resin material 13 is present toward the back of the recess 112 so as not to be present between the end surface 12S of the optical fiber 12 and the end surface 11S of the substrate-type optical waveguide device 11.

The optical fiber 12 may be provided with a spot-size converter for reducing the spot size of light guided through the core 121. Example spot-size converter s available include a lensed fiber, a GRIN lens fiber, and a high NA fiber. Such a spot-size converter is capable of reducing the spot size (which is of a waveguide mode guided through the core 121) on the end surface 12S to a size equivalent to the spot size (which is of a waveguide mode guided through the core 111 of the substrate-type optical waveguide device 11) on the end surface 11S. According to one or more embodiments the resin material 13 is used as a fixing material for fixing the optical fiber 12 to the substrate-type optical waveguide device 11. The present invention is, however, not limited to such an arrangement. The optical fiber 12 may be fixed to the substrate-type optical waveguide device 11 with use of a fixing material other than resin such as solder. According to one or more embodiments the resin material 13 is injected into the recess 112 of the substrate-type optical waveguide device 11. The present invention is, however, not limited to such an arrangement. The substrate-type optical waveguide device may have, for example, a V-shaped groove instead of the recess into which V-shaped groove the resin material 13 is injected. According to one or more embodiments the optical fiber 12 is fixed to the substrate-type optical waveguide device 11 with use of a fixing material. The present invention is, however, not limited to such an arrangement. The optical fiber may be fixed to the substrate-type optical waveguide device by a fixing method other than a method involving use of a fixing material.

[Setting Spot Size]

The description below deals with (i) the spot size $w1$ of a waveguide mode (for example, a basic mode) guided through the core 111 of the substrate-type optical waveguide device 11 and (ii) the spot size $w2$ of a waveguide mode (for example, a basic mode) guided through the core 121 of the optical fiber 12. The spot size $w1$ of a waveguide mode guided through the core 111 of the substrate-type optical waveguide device 11 refers to the radius of a region in the end surface 11S of the substrate-type optical waveguide device 11 in which region the waveguide mode has an intensity that is not less than $1/e^2$ of the peak intensity (see (a) of FIG. 2). The spot size $w1$ is equal to a half of the mode field diameter of the waveguide mode. Similarly, the spot size $w2$ of a waveguide mode guided through the core 121 of the optical fiber 12 refers to the radius of a region of the end surface 12S of the optical fiber 12 in which region the waveguide mode has an intensity that is not less than $1/e^2$ of the peak intensity (see (a) of FIG. 2). The spot size $w2$ is equal to a half of the mode field diameter of the waveguide mode. The description below uses the expression "spot size ratio" to refer to the ratio $w2/w1$ of the spot size $w2$ to the spot size $w1$.

Figure 2:
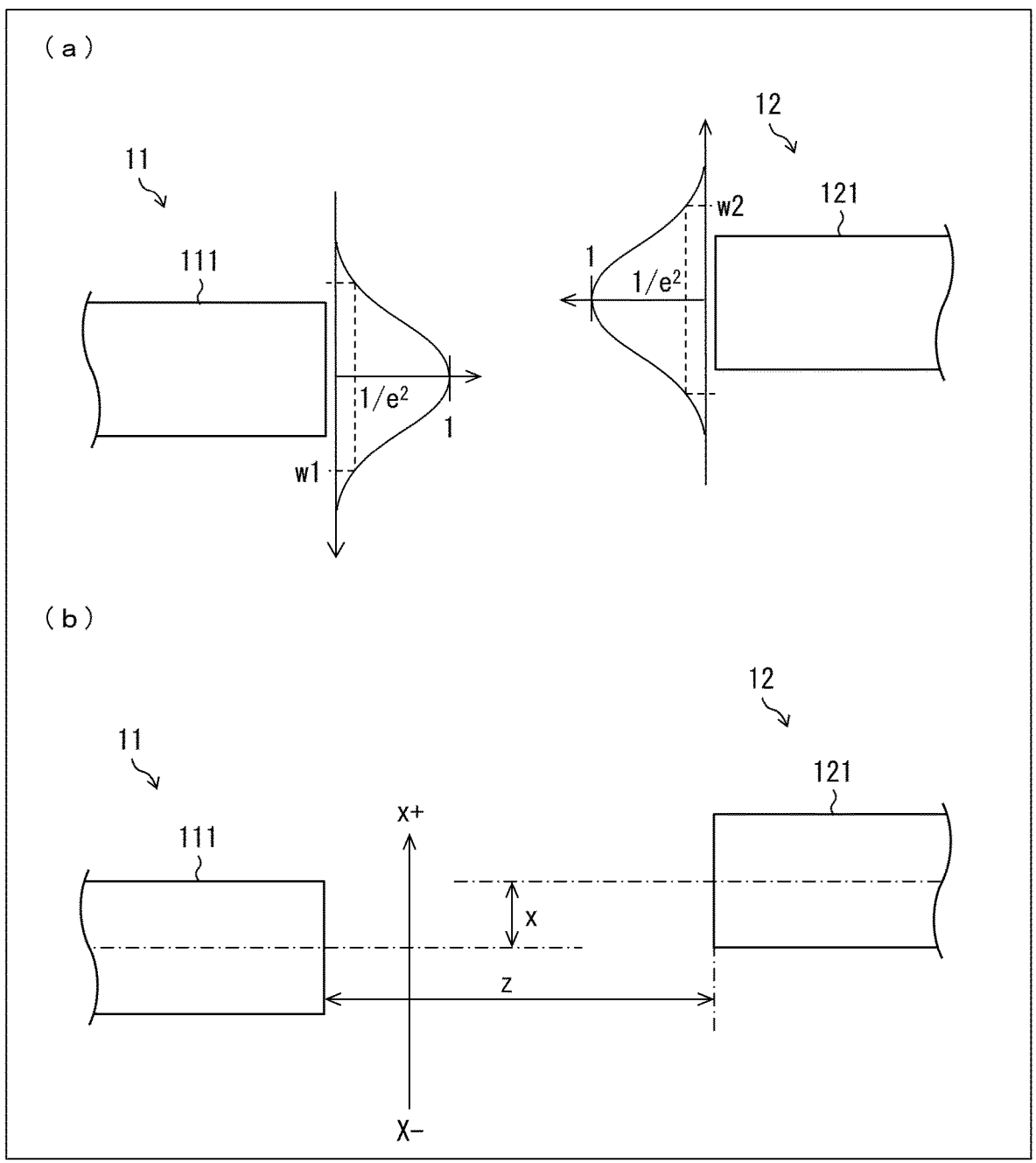
FIG. 2 provides side views of the core of a substrate-type optical waveguide device and the core of an optical fiber. (a) additionally shows the mode profile of a waveguide mode guided through each core. (b) additionally shows an arrow indicative of an axis misalignment amount x and an arrow indicative of an inter-end-surface distance z.

The description below uses the term "axis misalignment amount" and the symbol "x" to refer to the distance between the central axis of the core 111 of the substrate-type optical waveguide device 11 and the central axis of the core 121 of the optical fiber 12 (see (b) of FIG. 2). The description below also uses the term "inter-end-surface distance" and the symbol "z" to refer to the distance between the end surface 11S of the substrate-type optical waveguide device 11 and the end surface 12S of the optical fiber 12 (see (b) of FIG. 2). The axis misalignment amount x has a sign determined as follows: An x axis is assumed in a direction that is orthogonal to the central axis of the core 121 of the optical fiber 12 and that is parallel to a direction in which the optical fiber 12 may be displaced. (1) The axis misalignment amount x is positive in a case where the central axis of the core 121 of the optical fiber 12 is shifted from the central axis of the core 111 of the substrate-type optical waveguide device 11 on the x-axis positive direction side. (2) The axis misalignment amount x is negative in a case where the central axis of the core 121 of the optical fiber 12 is shifted from the central axis of the core 111 of the substrate-type optical waveguide device 11 on the x-axis negative direction side. The inter-end-surface distance z is always positive.

(a) of FIG. 3 is a graph that shows the efficiency $\eta$ [dB] of coupling between the core 111 of the substrate-type optical waveguide device 11 and the core 121 of the optical fiber 12 as a function of the axis misalignment amount x [μm] for cases where the spot size ratio $w2/w1$ is 1, 1.2, 1.55, 2, 2.41, and 2.8. The graph assumes the spot size $w1$ to be 1.5 μm, the inter-end-surface distance z to be 10 μm, and the wavelength $\lambda$ to be 1.55 μm. The graph of (a) of FIG. 3 shows that in each case, (i) the coupling efficiency $\eta$ is at its maximum in a case where the axis misalignment amount x is 0, and (ii) the coupling efficiency $\eta$ decreases as the absolute value |x| of the axis misalignment amount x increases. This tendency holds true regardless of the spot size $w1$ or the inter-end-surface distance z.

(b) of FIG. 3 is a graph that shows, as a function of the spot size ratio $w2/w1$, the ratio $d\eta/dx(1)$ [dB/μm] of change in the coupling efficiency T) [dB] for a case where the axis misalignment amount x is 1. The graph, as well as the above, assumes the spot size $w1$ to be 1.5 μm, the inter-end-surface distance z to be 10 μm, and the wavelength $\lambda$ to be 1.55 μm. The graph of (b) of FIG. 3 shows that the absolute value $|d\eta/dx(1)|$ of $d\eta/dx(1)$ decreases as $w2/w1$ increases. This means that the axis misalignment tolerance (that is, the tolerance of the axis misalignment amount x for the coupling efficiency $\eta$) increases as $w2/w1$ increases.

(c) of FIG. 3 is a graph that shows, as a function of the spot size ratio $w2/w1$, the coupling efficiency $\eta(0)$ [dB] for a case where the axis misalignment amount x is 0. The graph of (c) of FIG. 3 has a vertical axis indicative of the difference (coupling efficiency increase amount) obtained by subtracting, from each of the respective coupling efficiencies (0) for different spot size ratios $w2/w1$, the coupling efficiency $\eta(0)$ obtained when $w2/w1=1$. The graph, as well as the above, assumes the spot size $w1$ to be 1.5 μm, the inter-end-surface distance z to be 10 μm, and the wavelength $\lambda$ to be 1.55 μm. The graph of (c) of FIG. 3 shows that (0) for a case where $w2/w1=2.41$ is equal to $\eta(0)$ obtained when $w2/w1=1$ and that (0) for a case where $1<w2/w1<2.41$ is larger than (0) for the case where $w2/w1=1$. The graph also shows that $\eta(0)$ is at its maximum in a case where $w2/w1=1.55$ and that the range $1<w2/w1<2.41$ of the spot size ratio $w2/w1$ (in which range $\eta(0)$ is larger than in the case where $w2/w1=1$) can be divided into the following two segments: (1) a first range ($1<w2/w1<1.55$) in which the axis misalignment tolerance is relatively small and (2) a second range ($1.55<w2/w1<2.41$) in which the axis misalignment tolerance is relatively large.

The above knowledge obtained from (c) of FIG. 3 can be generalized as follows: First, there is a spot size ratio $\alpha$ at which the coupling efficiency $\eta(0)$ obtained when the axis misalignment amount x is 0 is equal to the coupling efficiency $\eta(0)$ for the case where $w2/w1=1$. The coupling efficiency $\eta(0)$ obtained when the axis misalignment amount x is 0 is larger in a case where $1<w2/w1<\alpha$ than in the case where $w2/w1=1$. Second, there is a spot size ratio $\beta$ at which the coupling efficiency $\eta(0)$ obtained when the axis misalignment amount x is 0 is at its maximum. The range $1<w2/w1<\alpha$ of the spot size ratio $w2/w1$ (in which range the coupling efficiency $\eta(0)$ obtained when the axis misalignment amount x is 0 is larger than in the case where $w2/w1=1$) can be divided into the following two segments: (1) a first range ($1<w2/w1<\beta$) in which the axis misalignment tolerance is relatively small and (2) a second range ($\beta<w2/w1<\alpha$) in which the axis misalignment tolerance is relatively large.

The optical module 1 in accordance with one or more embodiments may be arranged to have spot sizes $w1$ and $w2$ that satisfy the first condition $1<w2/w1<\alpha$. The symbol "a" indicates a spot size ratio $w2/w1$ at which the coupling efficiency $\eta(0)$ obtained when where the axis misalignment amount x is 0 is equal to the coupling efficiency $\eta(0)$ for the case where $w2/w1=1$. This makes it possible to produce an optical module 1 of which the coupling efficiency $\eta(0)$ obtained when the axis misalignment amount x is 0 is larger than in the case where $w2/w1=1$.

The optical module 1 in accordance with one or more embodiments may be arranged to have spot sizes $w1$ and $w2$ that satisfy the second condition $\beta<W2/W1<\alpha$. The symbol "0" indicates a spot size ratio at which the coupling efficiency $\eta(0)$ obtained when the axis misalignment amount x is 0 is at its maximum. This makes it possible to produce an optical module 1 of which (i) the coupling efficiency $\eta(0)$ obtained when the axis misalignment amount x is 0 is larger than in the case where $w2/w1=1$ and (ii) the axis misalignment tolerance is large.

The spot size ratios $\alpha$ and $\beta$ included in the above conditions can each be expressed as a function of the spot size $w1$ and the inter-end-surface distance z. The description below will deal with this point.

(a) of FIG. 4 is a graph that shows, as a function of the spot size ratio w2/w1, the coupling efficiency η(0) [dB] obtained when the axis misalignment amount x is 0 with z=10 and w1=0.8, 1.0, 1.5, 2.0, 2.5, and 3.0. The graph of (a) of FIG. 4 has a vertical axis indicative of the difference (coupling efficiency increase amount) obtained by subtracting, from each of the respective coupling efficiencies (0) for different spot size ratios w2/w1, the coupling efficiency η(0) for the case where w2/w1=1. The graph assumes the inter-end-surface distance z to be 10 μm and the wavelength λ to be 1.55 μm. (a) of FIG. 4 shows that the spot size ratio α (at which the coupling efficiency η(0) obtained when the axis misalignment amount x is 0 is equal to the coupling efficiency η(0) for the case where w2/w1=1) gradually decreases as the spot size w1 increases. (a) of FIG. 4 also shows that the spot size ratio β (at which the coupling efficiency η(0) obtained when the axis misalignment amount x is 0 is at its maximum) gradually decreases as the spot size w1 increases. (a) of FIG. 4 shows solid circles to each indicate a spot size ratio α and hollow rhombuses to each indicate a spot size ratio β.

(b) of FIG. 4 is a graph that shows, each as a function of w1, (i) the spot size ratio α (at which the coupling efficiency η(0) obtained when the axis misalignment amount x is 0 is equal to the coupling efficiency η(0) for the case where w2/w1=1) and the spot size ratio β (at which the coupling efficiency η(0) obtained when the axis misalignment amount x is 0 is at its maximum) for a case where z=10. The graph assumes the wavelength λ to be 1.55 μm. In the graph of (b) of FIG. 4, (i) the region below the line indicative of the spot size ratio α is a region in which the first condition described above is satisfied, and (ii) the region between the line indicative of the spot size ratio α and the line indicative of the spot size ratio 3 is a region in which the second condition described above is satisfied.

(c) of FIG. 4 is a graph that shows, each as a function of w1, (i) the spot size ratio α (at which the coupling efficiency η(0) obtained when the axis misalignment amount x is 0 is equal to the coupling efficiency η(0) for the case where w2/w1=1) and the spot size ratio β (at which the coupling efficiency η(0) obtained when the axis misalignment amount x is 0 is at its maximum) for cases where z=5, 10, and 20. The graph assumes the wavelength λ to be 1.55 μm. Regardless of the value of z, (i) the region below the line indicative of the spot size ratio α is a region in which the first condition described above is satisfied, and (ii) the region between the line indicative of the spot size ratio α and the line indicative of the spot size ratio β is a region in which the second condition described above is satisfied.

Each line indicative of the spot size ratio α in (c) of FIG. 4 can be well approximated with use of the curve α=a×w1$^b$+1. Table 1 below shows coefficients a and b each of which allows a minimum square error for the cases where Z=5, 10, and 20.

TABLE 1

| Coefficient | z = 5 | z = 10 | z = 20 | Linear approximation |
|---|---|---|---|---|
| a | 1.662 | 4.195 | 9.253 | a = 0.506z − 0.867 |
| b | −3.554 | −3.168 | −2.733 | b = 0.0531z − 3.7715 |

The coefficient a as a function of z can be linearly approximated as illustrated in (a) of FIG. 5. The square error is minimum with respect to the approximation line a=0.506z−0.867. The coefficient b as a function of z can be linearly approximated as illustrated in (b) of FIG. 5. The square error is minimum with respect to the approximation line b=0.0531z−3.7715.

The spot size ratio α (at which the coupling efficiency η(0) obtained when the axis misalignment amount x is 0 is equal to the coupling efficiency η(0) for the case where w2/w1=1) can thus be approximately expressed as below.

In a case where z=5, $\alpha = 1.662 \times w^{-3.554} + 1$.

In a case where z=10, $\alpha = 4.195 \times w1^{-3.168} + 1$.

In a case where z=20, $\alpha = 9.253 \times w^{-2.733} + 1$.

In general, $\alpha = (0.506z − 0.867) \times w1^{(0.0531z − 3.7715)} + 1$.

Similarly, each line indicative of the spot size ratio β in (c) of FIG. 4 can be well approximated with use of the curve β=aw1$^4$+bw1$^3$+cw1$^2$+dw1+e. Table 2 below shows coefficients a, b, c, d, and e each of which allows a minimum square error for the cases where Z=5, 10, and 20.

TABLE 2

| Coefficient | z = 5 | z = 10 | z = 20 | Linear approximation |
|---|---|---|---|---|
| a | 0.058 | 0.07 | 0.093 | a = 0.0023z + 0.0465 |
| b | −0.668 | −0.827 | −1.097 | b = −0.0284z − 0.533 |
| c | 2.829 | 3.646 | 4.855 | c = 0.133z + 2.2245 |
| d | −5.268 | −7.229 | −9.872 | d = −0.3008z − 3.9465 |
| e | 4.706 | 6.614 | 9.217 | e = 0.295z + 3.4045 |

The coefficient a as a function of z can be linearly approximated as illustrated in (a) of FIG. 6. The square error is minimum with the approximation line a=0.0023z+0.0465. The coefficient b as a function of z can be linearly approximated as illustrated in (b) of FIG. 6. The square error is minimum with the approximation line b=−0.0284z+0.533. The coefficient c as a function of z can be linearly approximated as illustrated in (c) of FIG. 6. The square error is minimum with the approximation line c=0.133z+2.2245. The coefficient d as a function of z can be linearly approximated as illustrated in (d) of FIG. 6. The square error is minimum with the approximation line d=−0.3008z−3.9465. The coefficient e as a function of z can be linearly approximated as illustrated in (e) of FIG. 6. The square error is minimum with the approximation line e=0.295z+3.4045.

The spot size ratio β at which the coupling efficiency η(0) obtained when the axis misalignment amount x is 0 is at its maximum) can thus be approximately expressed as below.

In a case where z=5, $\beta = 0.058 w1^4 − 0.668 w1^3 + 2.829 w1^2 − 5.268 w1 + 4.706$.

In a case where z=10, $\beta = 0.070 w1^4 − 0.827 w1^3 + 3.646 w1^2 − 7.229 w1 + 6.614$.

In a case where z=20, $\beta = 0.093 w1^4 − 1.097 w1^3 + 4.855 w1^2 − 9.872 w1 + 9.217$.

In general, $\beta = (0.0023z + 0.0465) w1^4 (0.0284z + 0.533) w1^3 + (0.133z + 2.2245) w1^2 (0.3008z + 3.9465) w1 + (0.295z + 3.4045)$.

Finally, the description below deals with the relation between the maximum value of the coupling efficiency increase amount and the spot size w1 with reference to FIG.

7. FIG. 7 provides graphs each of which shows the maximum value of the coupling efficiency increase amount as a function of the spot size w1. (a) of FIG. 7 assumes z=5 µm. (b) of FIG. 7 assumes z=10 µm. (c) of FIG. 7 assumes z=20.

The spot size w1 may not be more than 3 µm, or may not be more than 2 µm. (a) of FIG. 3 shows that in a case where z=5 µm, (i) a spot size w1 of not more than (i.e., less than or equal to) 3 µm allows the coupling efficiency increase amount to be not less than 0.001 dB, and (ii) a spot size w1 of not more than 2 µm allows the coupling efficiency increase amount to be not less than 0.01 dB. (b) of FIG. 3 shows that in a case where z=10 µm, (i) a spot size w1 of not more than 3 µm allows the coupling efficiency increase amount to be not less than 0.01 dB, and (ii) a spot size w1 of not more than 2 µm allows the coupling efficiency increase amount to be not less than 0.1 dB. (c) of FIG. 3 shows that in a case where z=20 µm, (i) a spot size w1 of not more than 3 µm allows the coupling efficiency increase amount to be not less than 0.1 dB, and (ii) a spot size w1 of not more than 2 µm allows the coupling efficiency increase amount to be not less than 1 dB.

One or more embodiments of the present invention can also be expressed as follows:

An optical module (1) in accordance with one or more embodiments includes: a substrate-type optical waveguide device (11); and an optical fiber (12) which guides light that enters the substrate-type optical waveguide device (11) or light that exited the substrate-type optical waveguide device (11), spot sizes w1 and w2 being set so that the following inequality is satisfied: $1 < w2/w1 < \alpha$, where w1 represents a spot size on an end surface (11S) of the substrate-type optical waveguide device (11), which spot size w1 is of a waveguide mode guided through a core (111) of the substrate-type optical waveguide device (11), w2 represents a spot size on an end surface (12S) of the optical fiber, which spot size w2 is of a waveguide mode guided through a core (121) of the optical fiber (12), and a represents a spot size ratio w2/w1 at which an efficiency η(0) of coupling between the substrate-type optical waveguide device (11) and the optical fiber (12) which efficiency η(0) is obtained when an amount of axis misalignment between the core (111) of the substrate-type optical waveguide device (11) and the core (121) of the optical fiber (12) is 0 is equal to an efficiency η(0) of coupling between the substrate-type optical waveguide device (11) and the optical fiber (12) which efficiency η(0) is obtained when w2/w1=1.

The above arrangement provides a substrate-type optical waveguide device of which the coupling efficiency η(0) for a case where the axis misalignment amount is 0 is larger than conventional (that is, in a case where the spot size ratio w2/w1 is not more than 1).

The optical module (1) in accordance with one or more embodiments may be arranged such that the spot sizes w1 and w2 are set so as to satisfy $\beta < w2/w1 < \alpha$, where β represents a spot size ratio w2/w1 at which the efficiency η(0) is at a maximum.

The above arrangement provides a substrate-type optical waveguide device of which the coupling efficiency η(0) for a case where the axis misalignment amount is 0 is larger than conventional and of which the axis misalignment tolerance is large.

The optical module (1) in accordance with one or more embodiments may be arranged such that the spot sizes w1 and w2 are set so as to satisfy $1 < w2/w1 < 1.662 \times w1^{-3.554} + 1$.

The above arrangement provides a substrate-type optical waveguide device of which the coupling efficiency η(0) for a case where the axis misalignment amount is 0 is larger than conventional in a case where the inter-end-surface distance between the substrate-type optical waveguide device and the optical fiber is approximately 5 µm.

The optical module (1) in accordance with one or more embodiments may be arranged such that the spot sizes w1 and w2 are set so as to satisfy $0.058w1^4 - 0.668w1^3 + 2.829w1^2 - 5.268w1 + 4.706 < w2/w1 < 1.662 \times w1^{-3.554} + 1$.

The above arrangement provides a substrate-type optical waveguide device of which the coupling efficiency η(0) for a case where the axis misalignment amount is 0 is larger than conventional and of which the axis misalignment tolerance is large in a case where the inter-end-surface distance between the substrate-type optical waveguide device and the optical fiber is approximately 5 µm.

The optical module (1) in accordance with one or more embodiments may be arranged such that the spot sizes w1 and w2 are set so as to satisfy $1 < w2/w1 < 4.195 \times w1^{-3.168} + 1$.

The above arrangement provides a substrate-type optical waveguide device of which the coupling efficiency η(0) for a case where the axis misalignment amount is 0 is larger than conventional in a case where the inter-end-surface distance between the substrate-type optical waveguide device and the optical fiber is approximately 10 µm.

The optical module (1) in accordance with one or more embodiments may be arranged such that the spot sizes w1 and w2 are set so as to satisfy $0.070w1^4 - 0.827w1^3 + 3.646w1^2 - 7.229w1 + 6.614 < w2/w1 < 4.195 \times w1^{-3.168} + 1$.

The above arrangement provides a substrate-type optical waveguide device of which the coupling efficiency η(0) for a case where the axis misalignment amount is 0 is larger than conventional and of which the axis misalignment tolerance is large in a case where the inter-end-surface distance between the substrate-type optical waveguide device and the optical fiber is approximately 10 µm.

The optical module (1) in accordance with one or more embodiments may be arranged such that the spot sizes w1 and w2 are set so as to satisfy $1 < w2/w1 < 9.253 \times w1^{-2.733} + 1$.

The above arrangement provides a substrate-type optical waveguide device of which the coupling efficiency η(0) for a case where the axis misalignment amount is 0 is larger than conventional in a case where the inter-end-surface distance between the substrate-type optical waveguide device and the optical fiber is approximately 20 µm.

The optical module (1) in accordance with one or more embodiments may be arranged such that the spot sizes w1 and w2 are set so as to satisfy $0.093w1^4 - 1.097w1^3 + 4.855w1^2 - 9.872w1 + 9.217 < w2/w1 < 9.253 \times w1^{-2.733} + 1$.

The above arrangement provides a substrate-type optical waveguide device of which the coupling efficiency η(0) for a case where the axis misalignment amount is 0 is larger than conventional and of which the axis misalignment tolerance is large in a case where the inter-end-surface distance between the substrate-type optical waveguide device and the optical fiber is approximately 20 µm.

The optical module (1) in accordance with one or more embodiments may be arranged such that the spot sizes w1 and w2 are set so as to satisfy $1 < w2/w1 < (0.506z - 0.867) \times w1^{(0.0531z - 3.7715)} + 1$, where z represents an inter-end-surface distance between the substrate-type optical waveguide device (11) and the optical fiber (12).

The above arrangement provides a substrate-type optical waveguide device of which the coupling efficiency η(0) for a case where the axis misalignment amount is 0 is larger than conventional (that is, in a case where the spot size ratio w2/w1 is not more than 1).

The optical module (1) in accordance with one or more embodiments may be arranged such that the spot sizes w1 and w2 are set so as to satisfy $(0.0023z+0.0465)w1^4-(0.0284z+0.533)w1^3+(0.133z+2.2245)w1^2-(0.3008z+3.9465)w1+(0.295z+3.4045)<w2/w1<(0.506z-0.867)\times w1^{(0.0531z-3.7715)}+1$.

The above arrangement provides a substrate-type optical waveguide device of which the coupling efficiency η(0) for a case where the axis misalignment amount is 0 is larger than conventional and of which the axis misalignment tolerance is large.

The optical module (1) in accordance with one or more embodiments may be arranged such that the spot size w1 is not more than 3 μm.

The above arrangement increases the coupling efficiency increase amount sufficiently.

A production method in accordance with one or more embodiments is a method for producing an optical module (1) including (i) a substrate-type optical waveguide device (11) and (ii) an optical fiber (12) which guides light that enters the substrate-type optical waveguide device (11) or light that exited the substrate-type optical waveguide device (11), the method including the step of: setting spot sizes w1 and w2 so that the following inequality is satisfied: 1<w2/w1<α, where w1 represents a spot size of a waveguide mode guided through a core (111) of the substrate-type optical waveguide device (11), w2 represents a spot size of a waveguide mode guided through a core (121) of the optical fiber (12), and α represents a spot size ratio w2/w1 at which an efficiency η(0) of coupling between the substrate-type optical waveguide device (11) and the optical fiber (12) which efficiency η(0) is obtained when an amount of axis misalignment between the core (111) of the substrate-type optical waveguide device (11) and the core (121) of the optical fiber (12) is 0 is equal to an efficiency η(0) of coupling between the substrate-type optical waveguide device (11) and the optical fiber (12) which efficiency η(0) is obtained when w2/w1=1.

The above production method allows production of a substrate-type optical waveguide device of which the coupling efficiency η(0) for a case where the axis misalignment amount is 0 is larger than conventional (that is, in a case where the spot size ratio w2/w1 is not more than 1).

The production method in accordance with one or more embodiments may be arranged such that the step includes setting the spot sizes w1 and w2 so as to satisfy 3<w2/w1<α, where β represents a spot size ratio w2/w1 at which the efficiency η(0) is at a maximum.

The above production method allows production of a substrate-type optical waveguide device of which the coupling efficiency η(0) for a case where the axis misalignment amount is 0 is larger than conventional and of which the axis misalignment tolerance is large.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical module
11 Substrate-type optical waveguide device
111 Core
112 Recess
12 Optical fiber
121 Core
122 Cladding
x Axis misalignment amount
z Inter-end-surface distance
w1 Spot size (for a substrate-type optical waveguide device)
w2 Spot size (for an optical fiber)

The invention claimed is:

1. An optical module comprising:
a substrate-type optical waveguide device; and
an optical fiber that guides light that enters or exits the substrate-type optical waveguide device, wherein
spot sizes w1 and w2 satisfy 1<w2/w1<α, where
w1 is a spot size:
on an end surface of the substrate-type optical waveguide device, and
of a waveguide mode guided through a core of the substrate-type optical waveguide device,
w2 is a spot size:
on an end surface of the optical fiber, and
of a waveguide mode guided through a core of the optical fiber,
α is a spot size ratio w2/w1 at which an efficiency η(0) is equal to the efficiency η(0) when w2/w1=1, where the efficiency η(0) is an efficiency of coupling between the substrate-type optical waveguide device and the optical fiber when an amount of axis misalignment between the core of the substrate-type optical waveguide device and the core of the optical fiber is 0, and
the spot size w1 is less than or equal to 3 μm.

2. The optical module according to claim 1, wherein the spot sizes w1 and w2 satisfy β<w2/w1<α, where β is a spot size ratio w2/w1 at which the efficiency η(0) is at a maximum.

3. The optical module according to claim 1, wherein the spot sizes w1 and w2 satisfy $1<w2/w1<1.662\times w1^{-3.554}+1$.

4. The optical module according to claim 3, wherein the spot sizes w1 and w2 satisfy $0.058w1^4-0.668w1^3+2.829w1^2-5.268w1+4.706<w2/w1<1.662\times w1^{-3.554}+1$.

5. The optical module according to claim 1, wherein the spot sizes w1 and w2 satisfy $1<w2/w1<4.195\times w1^{-3.168}+1$.

6. The optical module according to claim 5, wherein the spot sizes w1 and w2 satisfy $0.070w1^4-0.827w1^3+3.646w1^2-7.229w1+6.614<w2/w1<4.195\times w1^{-3.168}+1$.

7. The optical module according to claim 1, wherein the spot sizes w1 and w2 satisfy $1<w2/w1<9.253\times w1^{-2.733}+1$.

8. The optical module according to claim 7, wherein the spot sizes w1 and w2 satisfy $0.093w1^4-1.097w1^3+4.855w1^2-9.872w1+9.217<w2/w1<9.253\times w1^{-2.733}+1$.

9. The optical module according to claim 1, wherein the spot sizes w1 and w2 satisfy $1<w2/w1<(0.506z-0.867)\times w1^{(0.0531z-3.7715)}+1$,
where z is an inter-end-surface distance between the substrate-type optical waveguide device and the optical fiber.

10. The optical module according to claim 9, wherein the spot sizes w1 and w2 satisfy $(0.0023z+0.0465)w1^4-(0.0284z+0.533)w1^3+(0.133z+2.2245)w1^2-(0.3008z+3.9465)w1+(0.295z+3.4045)<w2/w1<(0.506z-0.867)\times w1^{(0.0531z-3.7715)}+1$.

11. A method for producing an optical module that comprises a substrate-type optical waveguide device and an optical fiber that guides light that enters or exits the substrate-type optical waveguide device, the method comprising:
  setting spot sizes w1 and w2 to satisfy $1<w2/w1<\alpha$, where
    w1 is a spot size:
      on an end surface of the substrate-type optical waveguide device, and
      of a waveguide mode guided through a core of the substrate-type optical waveguide device,
    w2 is a spot size:
      on an end surface of the optical fiber, and
      of a waveguide mode guided through a core of the optical fiber,
    $\alpha$ is a spot size ratio w2/w1 at which an efficiency $\eta(0)$ is equal to the efficiency $\eta(0)$ when w2/w1=1, where the efficiency $\eta(0)$ is an efficiency of coupling between the substrate-type optical waveguide device and the optical fiber when an amount of axis misalignment between the core of the substrate-type optical waveguide device and the core of the optical fiber is 0, and
    the spot size w1 is less than or equal to 3 μm.

12. The method according to claim 11, wherein
the spot sizes w1 and w2 satisfy $\beta<w2/w1<\alpha$, where $\beta$ is a spot size ratio w2/w1 at which the efficiency $\eta(0)$ is at a maximum.

13. An optical module comprising:
a substrate-type optical waveguide device; and
an optical fiber that guides light that enters or exits the substrate-type optical waveguide device, wherein
spot sizes w1 and w2 satisfy $1<w2/w1<\beta$, where
  w1 is a spot size:
    on an end surface of the substrate-type optical waveguide device, and
    of a waveguide mode guided through a core of the substrate-type optical waveguide device,
  w2 is a spot size:
    on an end surface of the optical fiber, and
    of a waveguide mode guided through a core of the optical fiber, and
  $\beta$ is a spot size ratio w2/w1 at which an efficiency $\eta(0)$ is at its maximum, where the efficiency $\eta(0)$ is an efficiency of coupling between the substrate-type optical waveguide device and the optical fiber when an amount of axis misalignment between the core of the substrate-type optical waveguide device and the core of the optical fiber is 0, and
  $\beta$ satisfies $\beta<\alpha$, where a is a spot size ratio w2/w1 at which the efficiency $\eta(0)$ is equal to the efficiency $\eta(0)$ when w2/w1=1.

14. The optical module according to claim 13, wherein the spot sizes w1 and w2 satisfy $1<w2/w1<0.058w1^4-0.668w1^3+2.829w1^2-5.268w1+4.706$.

15. The optical module according to claim 13, wherein the spot sizes w1 and w2 satisfy $1<w2/w1<0.070w1^4-0.827w1^3+3.646w1^2-7.229w1+6.614$.

16. The optical module according to claim 13, wherein the spot sizes w1 and w2 satisfy $1<w2/w1<0.093w1^4-1.097w1^3+4.855w1^2-9.872w1+9.217$.

17. The optical module according to claim 13, wherein the spot sizes w1 and w2 satisfy $1<w2/w1<(0.0023z+0.0465)w1^4-(0.0284z+0.533)w1^3+(0.133z+2.2245)w1^2-(0.3008z+3.9465)w1+(0.295z+3.4045)$,
where z is an inter-end-surface distance between the substrate-type optical waveguide device and the optical fiber.

18. The optical module according to claim 13, wherein the spot size w1 is less than or equal to 3 μm.

19. The method according to claim 11, wherein
the spot sizes w1 and w2 satisfy $1<w2/w1<\beta$, where $\beta$ is a spot size ratio w2/w1 at which the efficiency $\eta(0)$ is at its maximum, and
$\beta$ satisfies $\beta<\alpha$.

* * * * *